United States Patent
Roper et al.

(10) Patent No.: US 9,124,781 B1
(45) Date of Patent: Sep. 1, 2015

(54) APPARATUS AND METHOD FOR BROADCASTING VIDEO SURVEILLANCE DATA OVER A GLOBAL COMMUNICATION NETWORK

(75) Inventors: Thomas Ross Roper, Hoover, AL (US); Richard Stacy Weaver, Rainbow City, AL (US); Kendall Aaron Bauldree, Gardendale, AL (US)

(73) Assignee: Global Eye Monitor, LLC, Birmingham, AL (US)

( * ) Notice: Subject to any disclaimer, the term of this patent is extended or adjusted under 35 U.S.C. 154(b) by 1924 days.

(21) Appl. No.: 11/963,163

(22) Filed: Dec. 21, 2007

(51) Int. Cl.
*H04N 7/18* (2006.01)
*G08B 13/196* (2006.01)
*G07C 5/00* (2006.01)

(52) U.S. Cl.
CPC .......... *H04N 7/185* (2013.01); *G08B 13/19647* (2013.01); *G08B 13/19656* (2013.01); *G07C 5/008* (2013.01)

(58) Field of Classification Search
CPC ................. H04N 7/183; H04N 5/2252; G06T 2207/30232
USPC ........................................... 348/143
See application file for complete search history.

(56) References Cited

U.S. PATENT DOCUMENTS

| | | | |
|---|---|---|---|
| 7,227,475 B1 * | 6/2007 | Provenzano et al. | 340/995.24 |
| 7,835,331 B2 * | 11/2010 | Dickerson et al. | 370/338 |
| 2006/0209187 A1 * | 9/2006 | Farneman | 348/143 |
| 2006/0259933 A1 * | 11/2006 | Fishel et al. | 725/105 |
| 2006/0279423 A1 * | 12/2006 | Nazari | 340/541 |
| 2007/0052804 A1 * | 3/2007 | Money et al. | 348/143 |
| 2007/0076094 A1 * | 4/2007 | Dickerson et al. | 348/143 |
| 2007/0156706 A1 * | 7/2007 | Hayes | 707/10 |
| 2008/0136910 A1 * | 6/2008 | Berkey et al. | 348/143 |
| 2009/0195655 A1 * | 8/2009 | Pandey | 348/158 |
| 2011/0134243 A1 * | 6/2011 | Siann et al. | 348/143 |

* cited by examiner

*Primary Examiner* — Bryan Lee
(74) *Attorney, Agent, or Firm* — The Gache Law Firm, P.C.; Russell C. Gache

(57) ABSTRACT

An apparatus and method for obtaining real-time video data and broadcasting it to a remote PC or other mobile computing device upon request by a user. The transmitting unit uses the cellular transmission network to transmit video data at high speeds and is a self-contained, autonomous unit of relatively small size. The unit can also be easily camouflaged to avoid detection when utilized as a surveillance device.

16 Claims, 6 Drawing Sheets

APPARATUS AND METHOD FOR BROADCASTING VIDEO SURVEILLANCE DATA OVER A GLOBAL COMMUNICATION NETWORK

FIELD OF THE INVENTION

The present invention relates generally to the transmission of data over a global communications network, such as the Internet. In greater particularity, the present invention relates to the acquisition of video data from a self-contained, autonomous module and the transmission of that video data to a remote user. In even greater particularity, the present invention relates to the transmission of that video data to a remote user over a cellular network and over the Internet.

BACKGROUND OF THE INVENTION

Most typical video surveillance systems involve the acquisition of video data and the streaming of that data over either a dedicated circuit switched telephone line, over a dedicated or time multiplexed RF link, or over the Internet in packet-switched format. However, these systems are typically powered by facility power systems and transmit data through stationary computer equipment housed in environmentally controlled areas. The video capture devices similarly are tied to terrestrial power systems and typically use coaxial cable to transmit the captured video data over Ethernet CAT5 cable. Further, even if the systems are not land-wire linked to their transmitters, they cannot be moved because the RF transmitters require a fixed directional point for reception to which to transmit.

Further, the ability to communicate with a user of the Internet has heretofore been relegated to personal computers and video equipment tied to computer servers or computer terminals designed for the task of video capture and transmission in a production studio. Hence, video recording has evolved miniaturized systems to record video data on mediums that may be removed from the recording apparatus and placed into reproduction machines such as in video tape machines like VCRs. The video tape device can after playback transmit the information to another destination, albeit with the introduction of a time delay, and in a manner that reduces the usefulness of the video data.

Moreover, today's surveillance needs require real-time recording of actual events to be useful. For example, automobile traffic patterns change very quickly on highways and the timing of traffic lights and notification to motorists of traffic delays must be acquired and broadcasted in real-time to be useful. Or, if police are monitoring potential crime areas, real-time detection of an occurring crime can save a life, but only if the information is timely. Insurance companies could also use real-time surveillance to protect themselves against fraudulent submission of claims by camouflaging video surveillance systems in unobtrusive objects positioned in the vicinity of persons of interest to acquire video of suspects in acts that conflict with their claims submissions.

Unfortunately, an apparatus for the remote real-time acquisition of video data in a size and shape practical for deployment does not exist. Moreover, such an apparatus needs to be accessible from anywhere on the planet and needs to be untethered from wires for transmission and wires for supplying power. Hence, what is needed is a compact, self-contained video surveillance apparatus that can be deployed into remote areas and yet is accessible over the Internet to supply real-time video to a remote PC user.

SUMMARY OF THE INVENTION

In summary, the present apparatus is a compact, self-contained video recording and transmission unit that uses a cellular network to transmit video in real-time to a remote desktop of a PC. Communication with the apparatus occurs over the Internet or similar global communications network.

DESCRIPTION OF THE PREFERRED EMBODIMENTS

Figure 1:
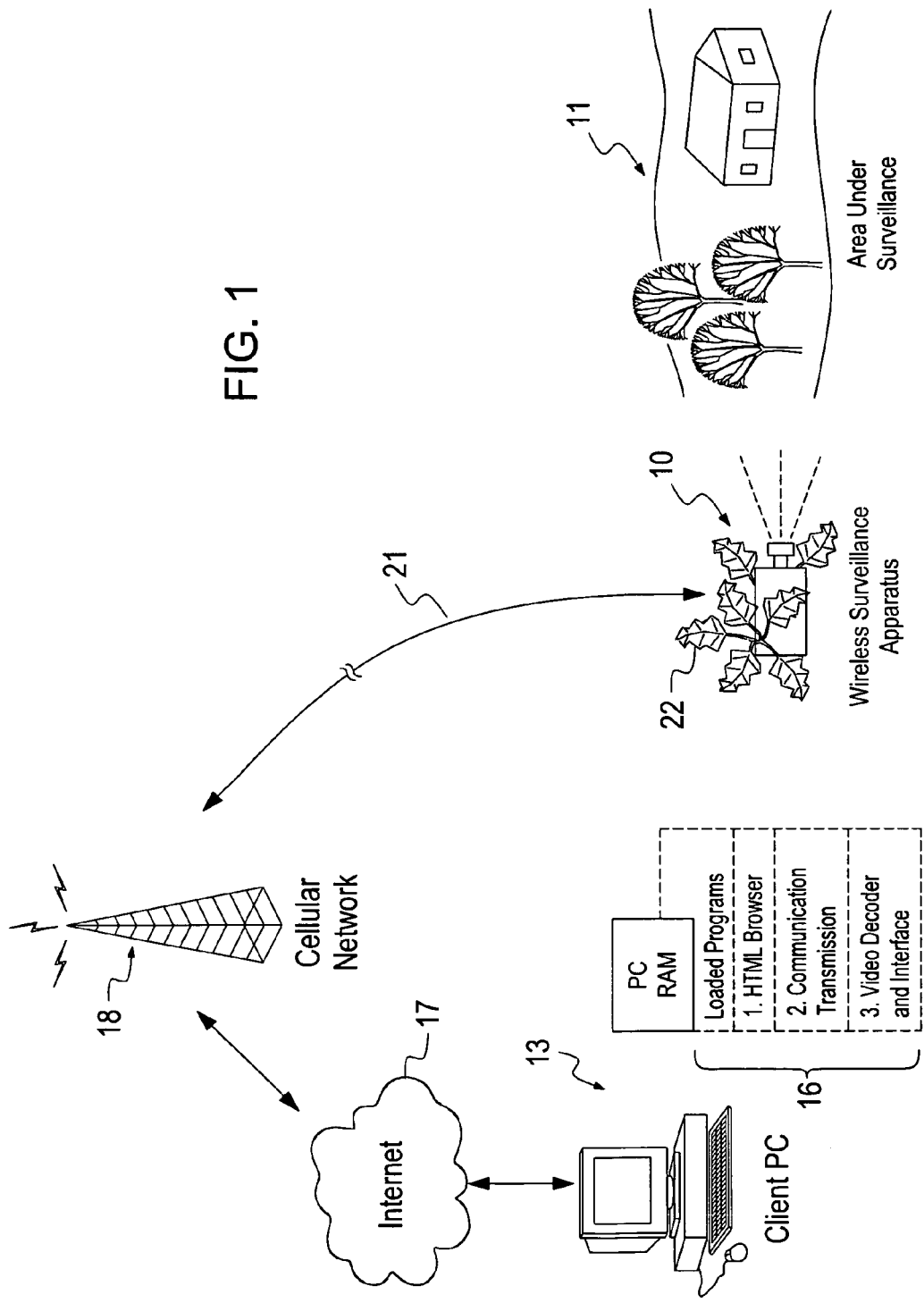
FIG. 1 is a block diagram showing a generalized view of the communications path from the invention to a remote PC user.

Referring to the drawings for a better understanding of the function and structure of the invention, FIG. 1 shows generalized structure for the apparatus 10 within its service confines. Specifically, apparatus 10 is positioned in a camouflaged manner, typically under naturally appearing brush 22 or within obscured support structures, and captures video information pertaining to an area under surveillance 11, such as office buildings, manufacturing yards, high crime or high security areas, hiking trails, college campus foot traffic areas, or other targeted areas desirable for surveillance. The apparatus 10 maintains constant communication through an available cellular network 18 which provides a backbone network superstructure to access and promote data through the Internet 17. The requesting personal computer ("PC") 13 having the appropriate software running thereon 16, provides data requests via the Internet 17, cellular network 18, and wireless cellular pathway 21 to the apparatus 10 to retrieve the captured video data at will, and in real-time.

Figure 2:
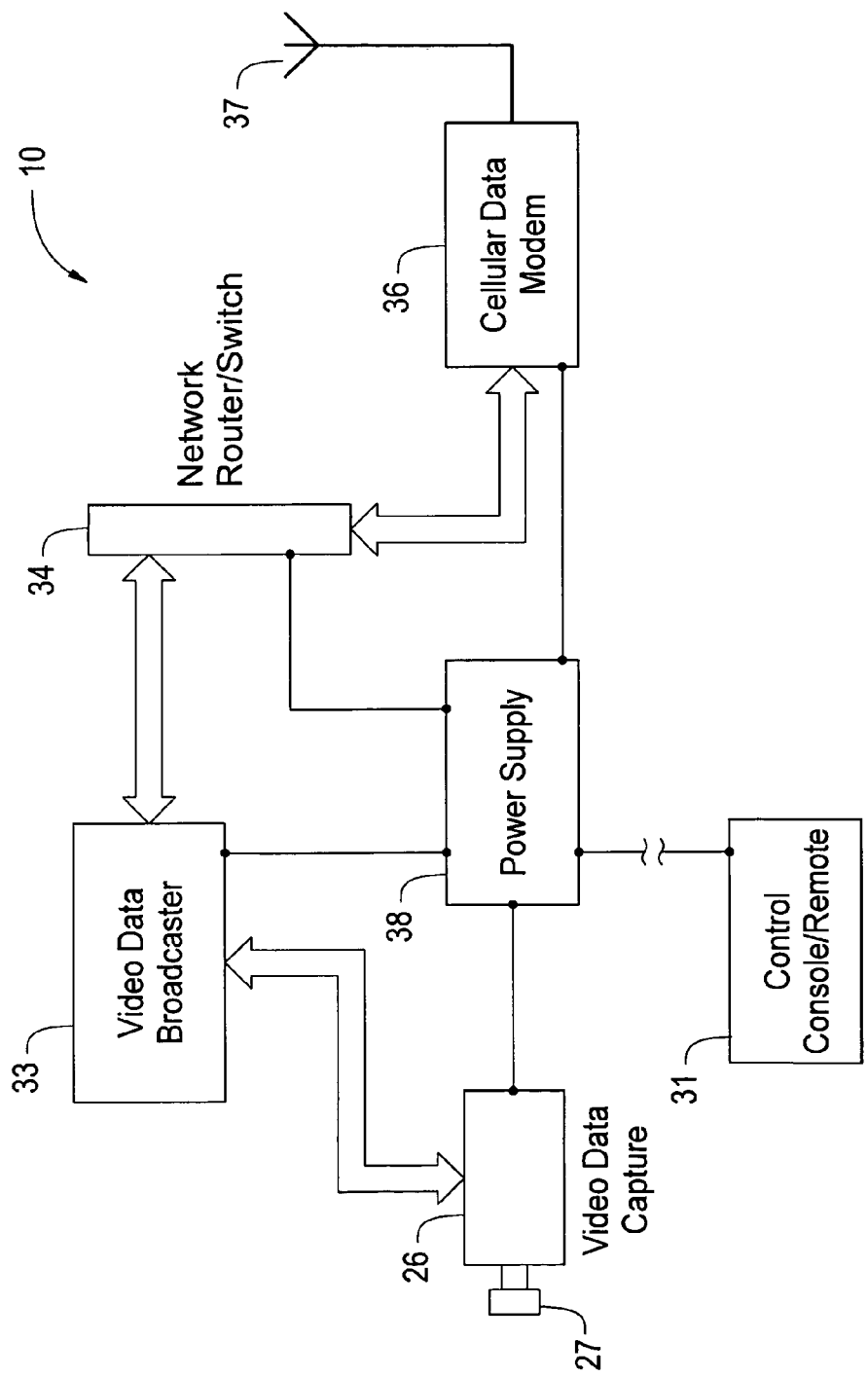
FIG. 2 is a system block diagram of the invention.

Referring now to FIG. 2, the apparatus 10 includes various components to achieve the real-time supply of video data to a remote PC user. Video data capture apparatus 26 obtains optical video data via lens 27, buffers the data as needed, and supplies the raw video data to video data broadcaster ("VDB") 33. A network router switch 34 assigns an IP address to the VDB 33 while recording its MAC address within its internal table. A cellular data modem 36 provides a data gateway for network router switch 34 via antenna 37 to communicate with cellular network 18. Power supply 38 provides power to the system 10 and control console 31 provides control inputs to the apparatus 10 for controlling same. Control console 31 may be a series of buttons on the exterior case of the apparatus 10, or it may consist of an infrared remote control device that communicates with the apparatus 10 to provide control instructions via an infrared optical reception lens.

Figure 3:
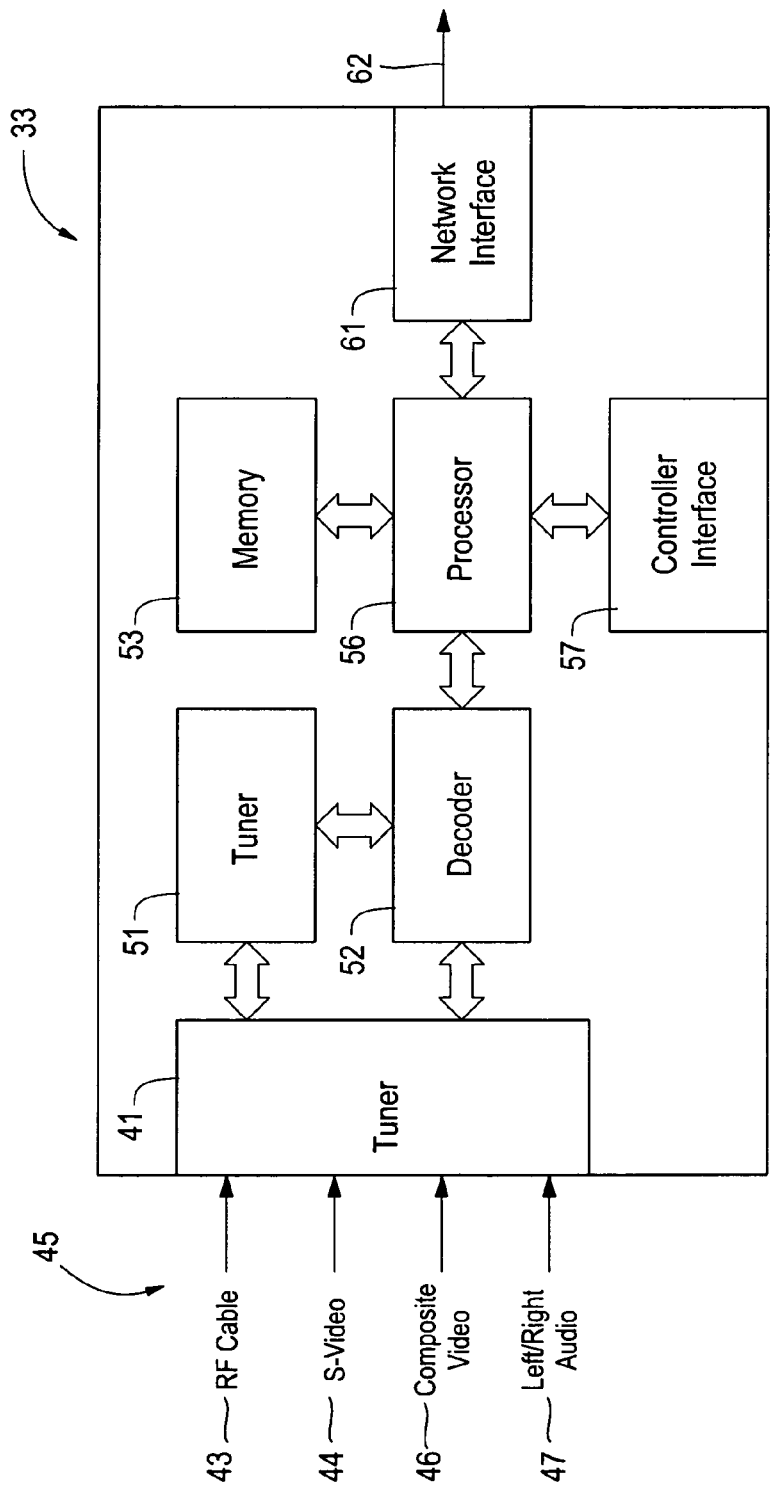
FIG. 3 is a system block diagram of the video broadcaster.

Turning now to FIG. 3, it may be seen that the VDB 33 consists of various processing elements that are typically ranged within a single manufactured circuit wiring board. For example, Sling Media, Inc. provides a pre-manufactured item called a "Slingbox" in various versions that satisfy the technical specifications required for a suitable VDB 33. The single printed circuit wiring board within a Slingbox, or other video broadcaster, may be removed and placed into the herein described system 10 to perform the duties required to properly capture, buffer, and transmit data to a PC via the Internet for decoding by video decoding and display by compatible software.

A suitable video data capture device 26 may be implemented by any currently available video data capture device, such as a Cannon handheld video recorder, so long as the data recorder will provide real-time output of video data via RGB, RCA connections, or via an alternate data connection such as a high-speed USB port. Further, many video data capture devices ("VDC") provide interactive reception and actuation of data video features via data cables, such as USB or RS232 connections, which may be implemented from the VDB 33. Assuming that the VDC 27 provides interactive command reception and actuation, the lens 27 may be articulated to vary the depth of field and focus of items within the field of view of the VDC 26. Some cameras also provide tilt and pan capabilities. These additional field of view articulations would be available via the data communications path to the VDC 26 also to enhance the apparatus' surveillance capability.

As shown in FIG. 3, various types of video input from the VDC 26 may be presented to the VDB 33 via the connections 45. For example, the well-known composite video signal 46 may be connected to input interface 41 along with audio connection 47, assuming that audio is also desired to be transmitted. Input interface 41 provides a communication path internally within the VDB 33 to pass video data to decoder 52. Tuner 51 is also available for decoding of radio frequency signals via cable input 43, however this item would likely be a superfluous element within the VDB system, unless VDC 26 was remotely positioned outside of apparatus 10 via an RF cable extension and encoded and transmitted signals over that coaxial cable to input 43. The decoder 52 decodes the video input 41 and places a pre-defined portion of the video data into memory 53 in accordance with processing instructions executed by processor 56. Controller interface 57 provides a control input for processor 56 which, in turn, controls other elements within the system 33. However, most likely, network interface 61 would provide the data command structure and control to VDB 33 from network connections 62 and remote user at PC 13.

Figure 4:
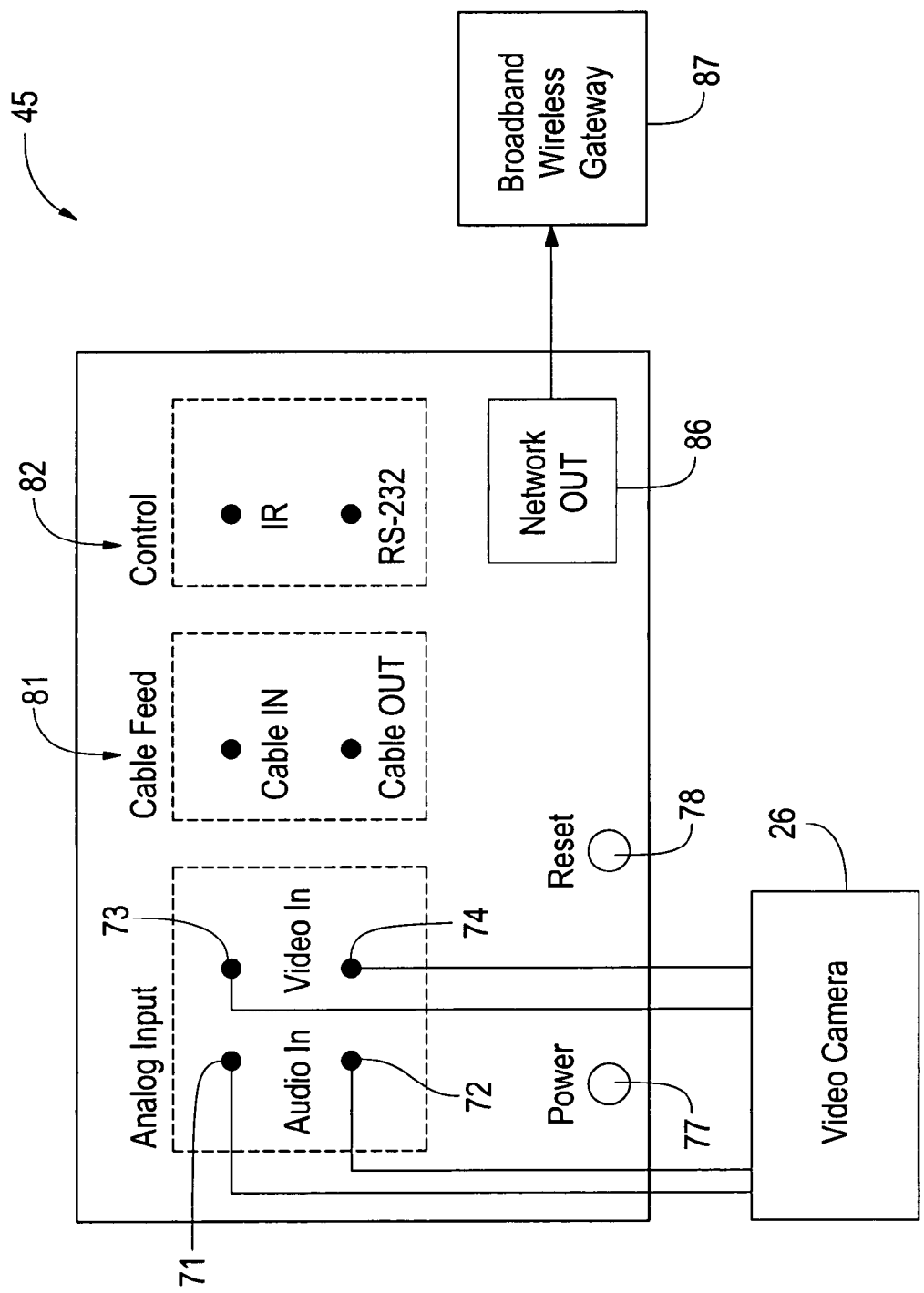
FIG. 4 is a input connection diagram from the perspective of the back of the video broadcaster.

Referring now to FIG. 4, the physical connections that are available between the VDB, the network router/switch 34, and the VDC 26 may be seen. VDC 26, in its most simplified and practical form, provides cable output from its source circuitry to analog input jacks 71, 72, 73, 74, to establish a hard-wired cable connection between VDC 26 and VDB 33. As indicated earlier, cable feed 81 is not applicable to the current situation unless the VDC is remotely located and a radio frequency transmitter is affixed to the VDC to provide encoded radio frequency video feed via cable to VDB 33. In which case the cable would connect to the cable jacks 81 and tuner 51 would provide the proper decoding to receive and store the video data. Control 82 would also be provided on VDB 33 via infrared connection or RS232 connections as needed. A reset button 78 is also provided in the event that the VDB becomes inoperative due to a software failure, and power cable input port 77 provides power to the VDB 33 from power supply 38. Network connection 86 provides a command signal reception area to control VDB 33 and to transmit recorded video data out to the herein described broadband wireless gateway 87.

Figure 5:
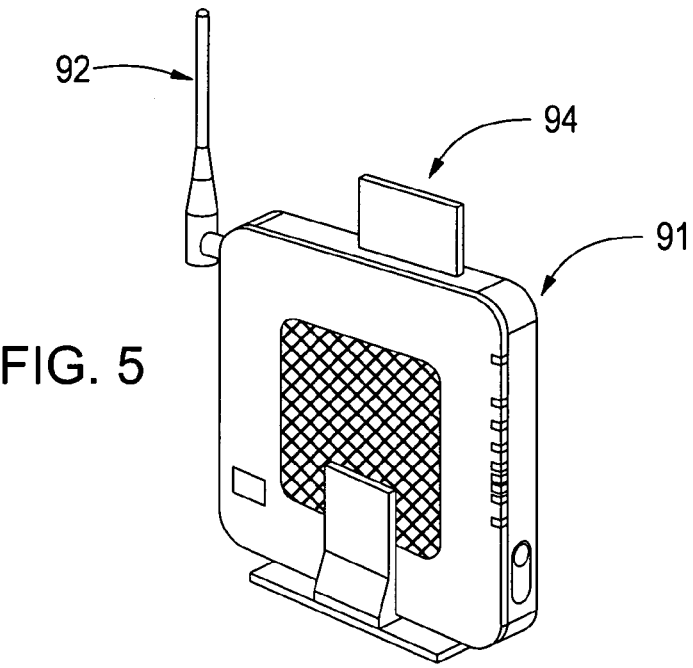
FIG. 5 is a picture of an acceptable broadband router showing the typical positioning of the cellular air-card that serves as a cellular modem.

Referring now to FIG. 5, it may be seen that a wireless router may serve as the network router/switch 34 for the herein described system 10 since it has a relatively compact size and configuration necessary for serving the network router/switch function 34 within the apparatus 10. The particular item shown in FIG. 5 is suitable for the purposes of the herein described apparatus 10 and includes the items of an antenna 92 and a wireless, cellular Air-card 94 that fits within a predefined socket port for router 91. As may be recognized, the item shown in FIG. 5 is offered by Linksys Corporation and consists of a wireless-G router that provides a mobile broadband connection through its mobile broadband data card 94. Lanksys model WRT54G3G-ST provides all the features necessary to implement the herein described requirements for the network router 34. However, several network electronics board manufactures exists that provide the required data rates and ports necessary to satisfy the herein described system requirements.

While the Linksys router provides for wireless 802.11G and 802.11B wireless routing capability, the wireless capability and antenna 92 are not necessary for a complete understanding and operation of the herein described invention because the most secure and reliable connection between the VDB 33 and the router 34 would be hard-wired Ethernet RJ-45 cable connection within the unit casing 10. Nevertheless, the inventors of the herein described system would envision implementation of external communications via the wireless capability of the router 34 to allow for re-programming and extraction of various functions and elements within system 10 and for "bleed-off" of video data as needed to enhance or facilitate data capture within the vicinity of the unit 10 within the surveillance zone 11 as needed. The Linksys router as described in FIG. 5 includes the ability to receive an RJ-45 data input and is manufactured in a single printed circuit wiring board configuration to allow for easy incorporation into the system body of the apparatus 10.

Figure 6:
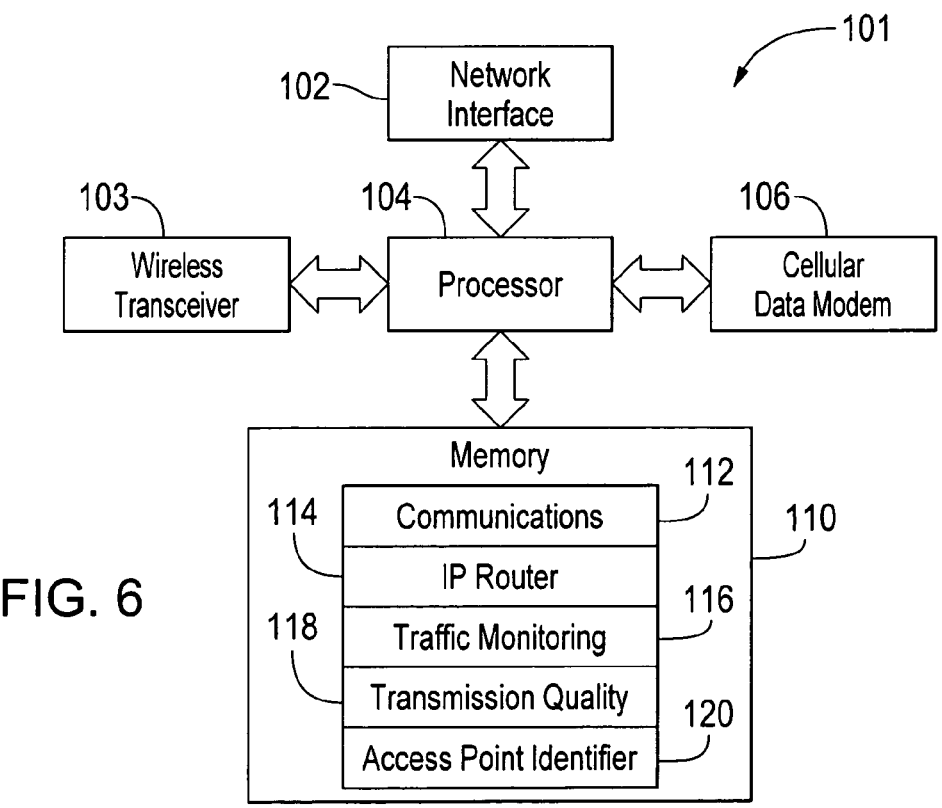
FIG. 6 is a functional processing diagram showing the major functions and subsystems of the network router and cellular modem; and, FIG. 7 is a data flow diagram showing the path through which the invention utilizes the cellular network to transfer video data to a PC.

Referring to now to FIG. 6, it may be seen that the network router 34 includes a network interface 102, a wireless transceiver 103, a processor 104, and various firmware and memory 110 from which processor 104 executes instructions. Memory 110 (firmware) includes communications protocol 112, an IP router algorithmic processing subroutine 114, a traffic monitor subroutine 116, a software module for transmission quality control 118, and an access point identifier 120 (e.g., assignment and monitoring of MAC addresses). Processor 104 utilizes the subroutine's present and its memory 110 in order to receive data via network interface 102 and transmit that data in a secure and reliable format via wireless cellular data modem 106. Processor 104 also controls command access to and from VDB 33 to receive and promote instructions to processor 56 within VDB 33 in order to execute instructions within the VDB 33. Processor 104, in conjunction with cellular modem 106, controls all of the communications from the apparatus 10 to and from cellular data modem 36, and further to a cellular network 18.

Aircard 94 consists of a cellular data modem that provides cellular wireless transceiver function as described in 106, but includes the cellular communication protocols necessary to transmit data packets to and from a wireless cellular network such that data lost is minimized and speed is maximized. In particular, the data card provides a broadband (e.g. greater than 52 KB bi-directional transmission rate) for the apparatus 10 in order to properly stream video data to a remote PC 13. A suitable cellular data modem is the Aircard 595 by Sierra Wireless Corporation. The Aircard 595 offers broadband like speeds with an average download speed of 600 kbps-1.5 Mbps and an average upload speed of 350-500 kbps. These speeds are acceptable ranges in order to stream live video from the apparatus 10 covering the surveillance area 11, and providing a high-speed data command download path in order to control the apparatus 10. As may be understood, various types of cellular Aircard type modems are available from various manufactures. Presently, most Aircards are designed to operate with specific cellular providers, however, data openness is continuing to proliferate within the cellular marketplace and it is envisioned by the inventors that an Aircard that communicates with all cellular vendors will be available in the very near future.

Figure 7:
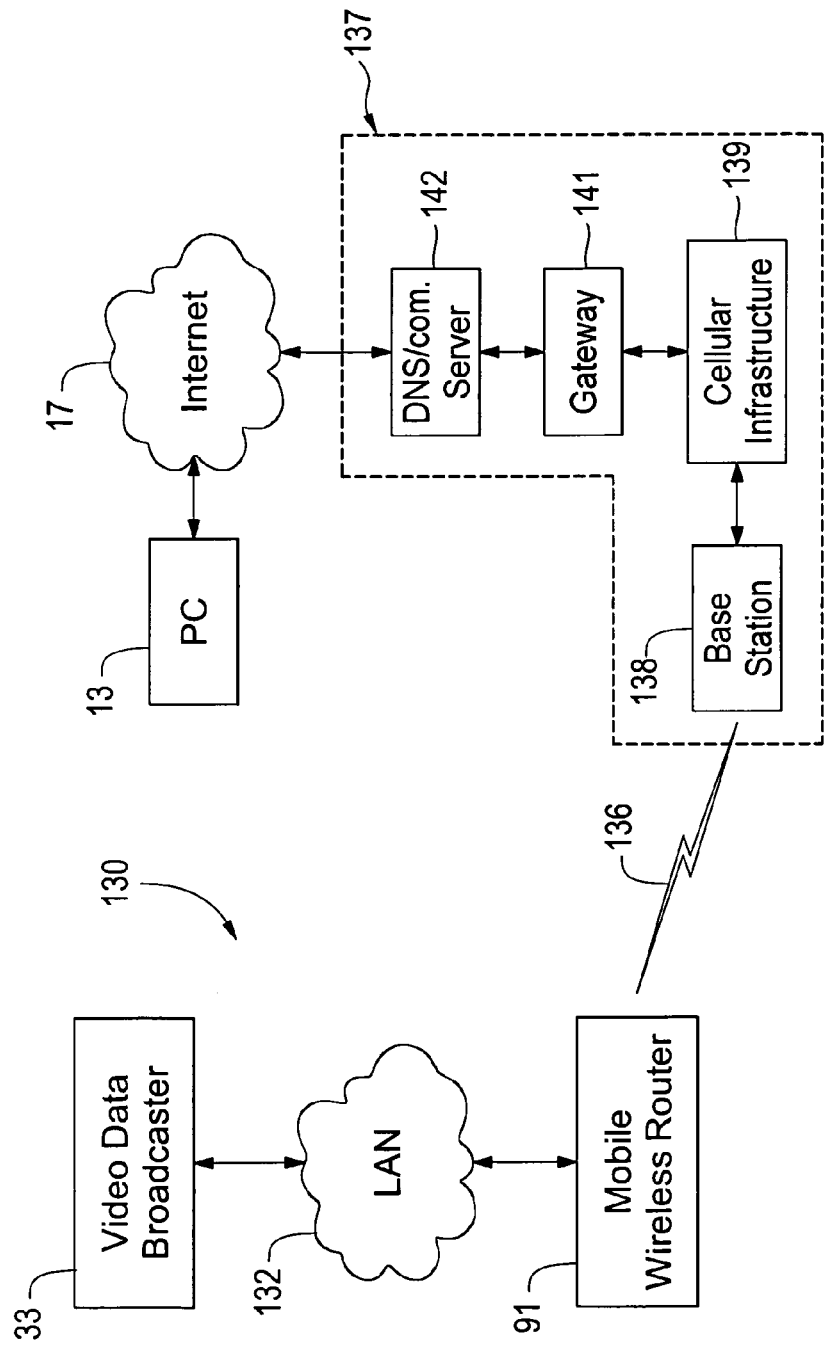

Referring now to FIG. 7, it may be seen that video data captured by the VDB 33 transmits video information held in its memory 53 via local area network 132 (e.g. an RJ-45 ethernet cable) to router 91 (34) that includes cellular data modem 36. Mobile router 91 communicates with cellular network 137 via base station 138 over cellular airways 136 and into cellular infrastructer 139. Router 91 is assigned an IP address from the cellular infrastructure 39 to the extent that ports within the router 91 are available or "open" as permitted by the cellular provider and their cellular network 137. For video transmissions, it is preferable for port 5005 to be open on the Aircard so that IP addressing can be known and utilized to communicate to the apparatus 10 from a PC without the reliance of a third party server holding the IP address and associated MAC address of the VDB 33. In the topology of a third party server retaining MAC identities, finder IDs are assigned to each device so that a user accessing the third party server may locate a particular broadcasting unit. The cellular provider then provides a gateway 141 from within its cellular infrastructure to additional routers 142 and DNS servers, and on to the Internet 17. Remote PC 13 then is able to access the apparatus 10 by its known pre-assigned IP address assigned by cellular infrastructure 139. Further, since router 34 has also be assigned an IP address to VDB 33 and contains a table within its memory assigning the MAC address for VDB 33 to the proper IP address held by network 34, PC 13 is able to communicate directly with the VDB 33 and obtain real-time video held within its memory 53 and issue commands to control the VDB, or the VDC 26 directly. It is important to note that while the cellular infrastructure 139 assigns an IP address to the wireless router 91, the IP address of the VDB 33 may be recorded and utilized from any PC 13 running suitable software 16 to access VDB 33 and control and receive video capture. In other words, location is irrelevant as long as an Internet connection is available. Further, third party software running on PC 13 may work in conjunction with VDB 33 to allow for direct connection with the VDB 33 without knowledge of the IP address of the VDB. Specifically, and as known in the art, third party servers utilize a "pinging" technology in order to access and record the MAC address of the VDB 33 on a third party server such that third party software running on a PC 13 may interrogate a third party server to uncover the MAC address associated with the VDB 33 and thereby render an IP address from the third party server lookup table. For example, Slingbox currently offers the third party application known as SlingPlayer Desktop that runs on a PC to locate and obtain video capture data from the VDB 33 because the MAC address of the VDB 33 is already resident with the third party server controlled by Slingmedia, Inc. and assigned a "Finker ID." The SlingPlayer Desktop software interrogates the Slingmedia server and obtains the IP address associated with the MAC address for the VDB 33 and is then able to communicate directly with the VDB 33 from the PC 13. Therefore, whether the IP is address is known (e.g. static IP) or must be retrieved via third party software, the apparatus 10 may be accessed via the Internet and over the cellular infrastructure 139 in order to retrieve in real-time video data held by the memory of the VDB 33. While the inventors have shown access to the apparatus 10 via a remote personal computer 13, the inventors envision and fully anticipate that other types of data viewing devices such as PDAs, mobile phones and laptop computers, and similar devices, will be able to access the apparatus 10 in the same manner as described above and retrieve video in real-time to each of them. For example Slingmedia offers a SlingPlayer mobile that currently runs on the Pocket PC 1.5 operating system, Windows Smartphones, Palm OS Systems, and the Mobile Symbian OS. This application runs on these mobile devices and PDAs and allows for remote viewing of video data on apparatus 10 in the same manner that video data would be available for viewing on a PC 13.

While the above apparatus 10 has been shown to utilize various and available elements that include the capabilities necessary for implementation of the apparatus 10, the inventors fully comprehend that a reduction of the above referenced elements into a single printed circuit wire board instead of a dual or three-sided printed circuit wiring board is envisioned. Nevertheless, the above referenced elements may be currently integrated within a relatively small plastic case to achieve the above described functionality. In addition, while the Slingplayer software is a useful utility and available for free download and usage on their VDB products, other third party applications are available that allow for accessing and retrieval of video data from a specified IP address using known protocols and using standardized broadcasting command controls.

While I have shown my invention in one form, it will be obvious to those skilled in the art that it is not so limited but is susceptible of various changes and modifications without departing from the spirit thereof.

Having set forth the nature of the invention, what is claimed is:

1. An autonomous self-contained apparatus for video surveillance, comprising:
a video capture device for capturing video data on an object of interest within a visible area of surveillance;
a video data broadcaster for receiving video data from said video capture device and storing said video data in memory for retrieval, said video data broadcaster including means for presenting a Media Access Control address to a network device;
a network router in network communication with said video data broadcaster, wherein said network router includes means for assigning an Internet Protocol address to said video data broadcaster and for receiving video data from said video data broadcaster, and wherein said network router includes a data card slot for accepting the insertion of compatible card devices;
a cellular data modem inserted into said card slot and in electrical communication with said network router, wherein said modem is in cellular communication with a cellular network;
a power supply for powering said video data capture device, said video data broadcaster, said network router, and said cellular data modem;
control means for controlling said apparatus;

wherein said control means is configured such that said apparatus for video surveillance operates in real-time to provide live video broadcasting to a remotely located personal computer via the Internet, said container positioned on a non-moving stationary location having said having said video capture device focused on a single viewing location, and wherein said video data broadcaster includes means for accepting commands from said remotely located personal computer via the Internet; and, wherein said power supply, said video data capture device, said video data broadcaster, said network router, and said cellular data modem are -contained within a single container, and wherein said single container has a camouflaged exterior, wherein said container is adapted to be camouflaged to match a camouflaged environment selected from the group consisting of a tree stump, a utility enclosure, tall grass, an elevated tree limb, plant hedges, and rocks, so that said video surveillance apparatus operates without being detected by nearby human observers.

2. An apparatus as recited in claim 1, wherein said video data broadcaster includes means to broadcast a Media Access Control address and an assigned Internet Protocol address to a third party computer server via the Internet.

3. An apparatus as recited in claim 2, wherein said cellular data modem provides a static Internet Protocol address to said network router.

4. An apparatus as recited in claim 3, wherein said video data broadcaster and said network router communicate over an Ethernet communications link.

5. An apparatus as recited in claim 4, wherein said apparatus comprises a single integrated printed circuit wiring board within said case.

6. An apparatus as recited in claim 5, wherein said cellular data modem transfers data at at least one megabits per second transmission rate.

7. An autonomous self-contained apparatus for video surveillance, comprising:
means for capturing video data on an object of interest within a visible area of surveillance;
means for receiving video data from said video capture means and storing said video data in memory for broadcast, said video broadcaster means including means for presenting a Media Access Control address to a network device;
router means in network communication with said video broadcaster means for receiving data communications from said video broadcasting means and for assigning an Internet Protocol address to said video broadcaster means, and wherein said router means includes a data card slot for accepting the insertion of compatible card devices;
data modem means inserted into and in electrical communication with said network router for communicating with a cellular network;
means for powering said apparatus;
control means for controlling said apparatus
wherein said control means is configured such that said apparatus for video surveillance operates in real-time to provide live video broadcasting to a remotely located personal computer via the Internet, and wherein said video broadcaster means includes means for accepting commands from said remotely located personal computer via the Internet; and,
wherein said apparatus is held within a single container, said container positioned at a non-moving stationary location having said means for capturing video data focused on a single viewing location, and wherein said container is adapted to be camouflaged to match a camouflaged environment selected from the group consisting of a tree stump, a utility enclosure, tall grass, an elevated tree limb, plant hedges, and rocks.

8. An apparatus as recited in claim 7, wherein said video broadcaster means includes means to broadcast a Media Access Control address and its assigned Internet Protocol address to a third party computer server via the Internet.

9. An apparatus as recited in claim 7, wherein said cellular data modem provides a static Internet Protocol address to said router means assigned by said cellular network.

10. An apparatus as recited in claim 9, wherein said video broadcaster means and said router means communicate with each other via an Ethernet communications link.

11. An apparatus as recited in claim 10, wherein said apparatus comprises a single integrated printed circuit wiring board within said case.

12. An apparatus as recited in claim 11, wherein said modem means transfers data at least one megabits per second transmission rate.

13. A method of broadcasting video from a transportable surveillance apparatus housed within a single enclosure, comprising the steps of:
acquiring video data on a single stationary object of interest within a visible area of surveillance within 200 feet of said enclosure from a camera within said enclosure;
transferring said video data to a video data broadcaster held within said enclosure wherein said video data broadcaster includes having an assigned media access control address and saved in the memory of said same;
assigning an Internet Protocol address to said video data broadcaster from a router housed within said enclosure and in electrical communication with said video broadcaster;
establishing a data communications link between said enclosure and a cellular network via a cellular data modem plugged into a slot on said router;
said data broadcaster receiving a broadcast command from a remote personal computer via the Internet;
transmitting live video data from said broadcaster to said remote personal computer over said cellular network for real-time surveillance; and,
wherein the above steps occur from within a said single enclosure, said enclosure positioned on a non-moving stationary location having said having said camera focused on a single viewing location, and wherein said enclosure is camouflaged to match an environment, selected from the group consisting of a tree stump, a utility enclosure, tall grass, an elevated tree limb, plant hedges, and rocks, in which said enclosure is positioned.

14. The method of claim 13, wherein said step of assigning an IP address to said video broadcaster comprises assigning a dedicated Internet Protocol address.

15. The method of claim 14, further including the step of transferring the Media Access Control address of said video broadcaster and its assigned Internet Protocol address to a third party server via the Internet so that video decoding software on said remote personal computer may find the Internet Protocol address of said video broadcaster for accessing same.

16. The method of claim 15, wherein said step of said data broadcaster receiving a broadcast command from a remote personal computer via the Internet is addition to a step of said data broadcaster receiving a broadcast command from a cellular telephone, and wherein said step of transmitting video data from said broadcaster to said remote personal computer over said cellular network is addition to a step of transmitting video data from said broadcaster to said cellular phone over said cellular network.

* * * * *